United States Patent
Vining et al.

(10) Patent No.: US 12,461,874 B2
(45) Date of Patent: Nov. 4, 2025

(54) REPEATER BABBLE DETECTION

(71) Applicant: TEXAS INSTRUMENTS INCORPORATED, Dallas, TX (US)

(72) Inventors: Suzanne M. Vining, Plano, TX (US); Julie Nirchi, Allen, TX (US); Win Naing Maung, Plano, TX (US); Douglas E. Wente, Murphy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 31 days.

(21) Appl. No.: 18/193,926

(22) Filed: Mar. 31, 2023

(65) Prior Publication Data

US 2024/0045819 A1  Feb. 8, 2024

Related U.S. Application Data

(60) Provisional application No. 63/394,679, filed on Aug. 3, 2022.

(51) Int. Cl.
*G06F 13/38* (2006.01)
*G06F 13/40* (2006.01)

(52) U.S. Cl.
CPC ........ *G06F 13/382* (2013.01); *G06F 13/4004* (2013.01)

(58) Field of Classification Search
None
See application file for complete search history.

(56) References Cited

U.S. PATENT DOCUMENTS

| | | | |
|---|---|---|---|
| 6,381,666 B1 | 4/2002 | Kejser et al. | |
| 7,035,948 B1 * | 4/2006 | Liang | G06F 13/385 710/52 |
| 10,788,580 B1 * | 9/2020 | Kavaler | G01S 13/0209 |
| 11,228,314 B1 * | 1/2022 | Delshadpour | H03K 19/017545 |
| 12,042,201 B2 * | 7/2024 | Henderson | A61B 18/1233 |
| 2008/0162974 A1 * | 7/2008 | Keys | G06F 13/385 713/400 |
| 2010/0005281 A1 * | 1/2010 | Buchmann | G06F 13/4243 713/2 |
| 2011/0012661 A1 * | 1/2011 | Binder | A63H 33/08 307/41 |
| 2014/0225763 A1 * | 8/2014 | Kavaler | G08G 1/142 342/70 |

(Continued)

OTHER PUBLICATIONS

International Search Report in corresponding PCT Patent Application No. PCT/US2023/029398, mailed Oct. 4, 2023, (3 pages).

(Continued)

*Primary Examiner* — Henry Tsai
*Assistant Examiner* — Aurangzeb Hassan
(74) *Attorney, Agent, or Firm* — Mandy Barsilai Fernandez; Frank D. Cimino

(57) ABSTRACT

In some examples, an apparatus includes a circuit configured to receive communication on a first bus. The circuit is also configured to provide the communication on a second bus for a first period of time. The circuit is also configured to monitor a duration of the providing of the communication on the second bus. The circuit is also configured to, responsive to the duration exceeding a threshold amount, stop providing the communication on the second bus for a second period of time.

12 Claims, 7 Drawing Sheets

(56) References Cited

U.S. PATENT DOCUMENTS

| | | | | |
|---|---|---|---|---|
| 2018/0373670 | A1* | 12/2018 | Low | G06F 13/4282 |
| 2020/0059224 | A1* | 2/2020 | Jiang | H03K 19/20 |
| 2020/0257354 | A1* | 8/2020 | Vining | G06F 13/4282 |
| 2020/0313723 | A1* | 10/2020 | Vining | G06F 13/4282 |
| 2022/0018881 | A1* | 1/2022 | Delshadpour | G06F 13/4282 |
| 2022/0035433 | A1* | 2/2022 | Franko | G06F 11/3062 |
| 2022/0283624 | A1* | 9/2022 | Bajpai | G06F 1/3253 |
| 2022/0391345 | A1* | 12/2022 | Kamath | G06F 13/4282 |
| 2023/0079021 | A1* | 3/2023 | Gupta | G01R 23/15 375/252 |
| 2023/0079861 | A1* | 3/2023 | Zhang | H03K 17/56 327/109 |
| 2023/0090431 | A1* | 3/2023 | Banin | H04B 1/04 375/295 |
| 2023/0103334 | A1* | 4/2023 | Liu | H03K 5/24 324/538 |
| 2023/0111357 | A1* | 4/2023 | Maung | G06F 13/4282 710/25 |
| 2023/0170934 | A1* | 6/2023 | Gupta | G06F 13/4045 375/211 |

OTHER PUBLICATIONS

Universal Serial Bus Specification Revision 2.0, Compaq Hewlett-Packard Apr. 27, 2000 (446 pages).

* cited by examiner

REPEATER BABBLE DETECTION

CROSS-REFERENCE TO RELATED APPLICATIONS

The present application claims priority to U.S. Provisional Patent Application No. 63/394,679, which was filed Aug. 3, 2022, is titled "USB 2.0 HS Babble Detection and Response by eUSB2 Repeater," and is hereby incorporated herein by reference in its entirety.

BACKGROUND

Universal Serial Bus (USB) is a standard establishing specifications for interconnect cabling, connectors, and communication protocols between peripheral devices. Embedded USB (eUSB) extends at least some of the USB protocols to interconnect cabling, connectors, and communication protocols among individual subsystems or circuits (e.g., such as a system-on-a-chip (SoC)).

SUMMARY

In some examples, an apparatus includes a circuit that includes repeater circuitry, a processing circuit, a first logic circuit, a second logic circuit, a timer circuit, and a third logic circuit. The repeater circuitry has first and second inputs and first and second outputs. The processing circuit has first and second outputs. The first logic circuit has an output and first and second inputs, wherein the first input of the first logic circuit is coupled to the second output of the processing circuit, and the second input of the first logic circuit is coupled to the second output of the repeater circuitry. The second logic circuit has an output and first and second inputs, wherein the first input of the second logic circuit is coupled to the output of the first logic circuit. The timer circuit has an output and first and second inputs, wherein the first input of the timer circuit is coupled to the output of the first logic circuit, the second input of the timer circuit is coupled to the output of the second logic circuit, and the output of the timer circuit is coupled to the second input of the second logic circuit. The third logic circuit has an output and first and second inputs, wherein the first input of the third logic circuit is coupled to the first output of the processing circuit, the second input of the third logic circuit is coupled to the output of the timer circuit, and the output of the third logic circuit is coupled to the second input of the repeater circuitry.

In some examples, an apparatus includes a circuit configured to receive communication on a first bus. The circuit is also configured to provide the communication on a second bus for a first period of time. The circuit is also configured to monitor a duration of the providing of the communication on the second bus. The circuit is also configured to, responsive to the duration exceeding a threshold amount, stop providing the communication on the second bus for a second period of time.

In some examples, a method includes receiving data at a repeater via a first bus for consecutive first and second periods of time. The method also includes providing the data at a second bus of the repeater for the first period of time. The method also includes monitoring a duration of the first period of time. The method also includes responsive to the duration exceeding a threshold amount, disabling the repeater for the second period of time.

DETAILED DESCRIPTION

Figure 1:
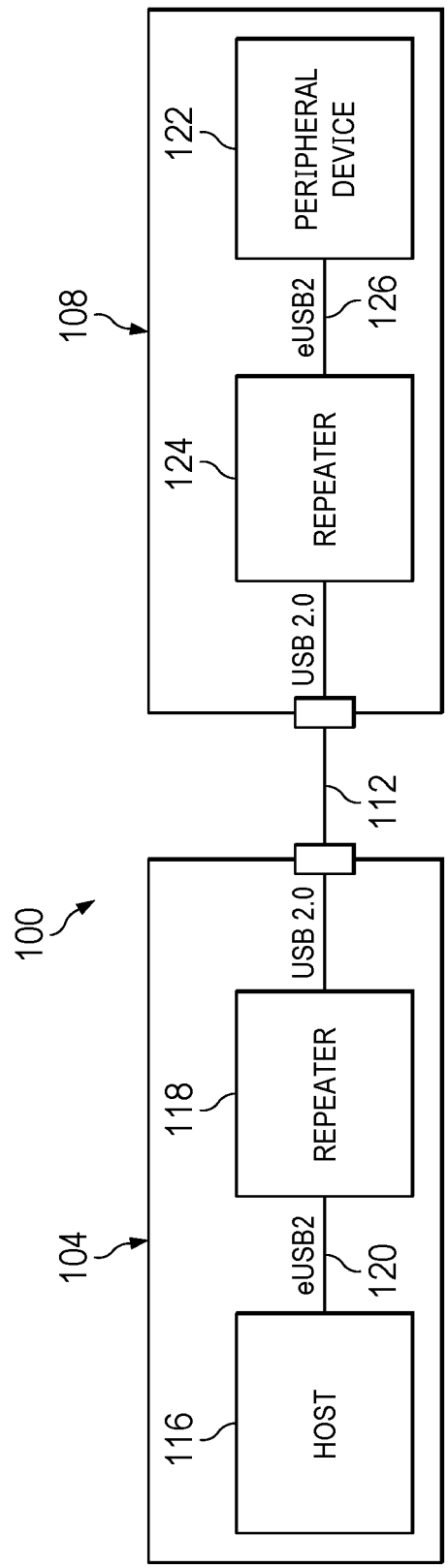
FIG. 1 is a block diagram of an example system.

As described above, USB is a standard establishing specifications for interconnect cabling, connectors, and communication protocols. As referred to herein, USB refers to any version of the USB specification, including any amendments or supplements, certified by the USB Implementers Forum (USB IF) or any suitable body who replaces and/or aids the USB IF in its role overseeing the USB specification, whether now existing or later developed. In at least one example, USB, as referred to herein, encompasses any one or more of the USB 1.0 specification, USB 2.0 specification, USB 3.0 specification, USB 4.0 specification, or any derivatives thereof, such as amended or ".x" variations of the above specifications. Also, as referred to herein, legacy USB refers to USB 2.x and/or USB 1.x. Embedded USB (eUSB), in at least some examples, refers to eUSB2.0 or eUSB2. While reference is made herein to eUSB2, in various examples the teachings of the present description are further applicable to other versions of eUSB2 that are extensions of, alternatives to, derivatives of, or otherwise share at least some commonalities with, or similarities to, eUSB2. Accordingly, while eUSB2 is referred to herein in an exemplary manner, the present description is, in some examples, not limited to implementation in an eUSB2.0 environment, in an eUSB2 environment, or in a USB environment.

At its inception, USB was primarily envisioned for implementation in specifying standards for connection and communication between personal computers and peripheral devices. However, as adoption of the USB standard has expanded and implementation in computing devices of support for the USB standard has gained in popularity, efforts have been made to extend and expand the applicability of USB. For example, while initially establishing specifications for communications between personal computers and peripheral devices, USB has expanded to communication between peripheral devices, between personal computers, and other use cases. As a result of such widespread implementation and use of USB, efforts are being further made to utilize USB as a communication protocol among individual subsystems or circuits (e.g., such as a system-on-a-chip (SoC)). Such implementations are sometimes referred to as eUSB2.0, or more simply eUSB2. New challenges arise in implementing eUSB2. For example, at a circuit level, computing devices often operate at voltage levels that vary from those of legacy USB, creating an impediment between direct communication between eUSB2 and legacy USB systems. To mitigate this impediment, an eUSB2 repeater operates as a bridge or non-linear redriver between eUSB2 and legacy USB systems, or vice versa, to translate between legacy USB signaling voltage levels that are customarily about 3.3 volts (V) and eUSB2 signaling voltages levels that are circuit-level (e.g., silicon appropriate voltages) such as about 1.0 V, 1.2 V, 1.4 V, or any other suitable value less than 3.3 V.

In some circumstances, a device continues signaling beyond a longest packet duration specified in a communication standard (e.g., USB or eUSB2) according to which it is communicating. For example, a longest packet duration according to some communication standards or protocols may be about 20 microseconds (us). A device that continues signaling beyond this longest packet duration is said to babble. In example of a communication system including a first device, an eUSB2 repeater, and a second device, in which the first device is signaling data to the repeater, which repeats the data to the second device, the second device may be able to detect the first device babbling. However, while the repeater is repeating the data to the second device, a signal from the second device informing the repeater of the first device babbling may not be detectable by the repeater because of signaling lines between the repeater and the second device being occupied by the data being repeated. To mitigate this, some repeaters may include separate or dedicated reset pins or ports, outside of the pins or ports specified according to USB or eUSB2. However, this approach is not standardized and requires extra pins, therefore increasing space and cost of such an implementation.

Examples of this description provide for a repeater capable of detecting a babble condition and initiating a connection reset. For example, the repeater may monitor an amount of time for which the repeater is repeating data (or conversely, not repeating data) from a first device to a second device. Responsive to that amount of time exceeding a threshold amount, the repeater may be internally disabled to reset the repeater and/or prevent the repeater from repeating the data received from the first device, resolving the babble condition as seen at the second device. In some examples, the first device detects the disabling of the repeater and ceases transmitting responsive to the disabling and disconnection of the repeater.

FIG. 1 is a block diagram of an example system 100. In an example, the system 100 includes a host system 104 having a host device 116 and a repeater (e.g., eUSB2 repeater) 118, and a peripheral system 108 having a peripheral device 122 and a repeater (e.g., eUSB2 repeater) 124. The host system 104 is coupled to the peripheral system 108 via a bus 112, such as a USB 2.0 bus. The host device 116 is coupled to the eUSB2 repeater 118 (which may also be referred to as a host-side repeater 118) over an eUSB2 bus 120. The peripheral device 122 is coupled to the eUSB2 repeater 124 (which may also be referred to as peripheral-side repeater 124) over an eUSB2 bus 126. In various examples, the host device 116 may be an application processor unit (APU), a microcontroller unit (MCU), a general purpose processor, logic circuitry, memory, analog circuitry and/or a state machine. The peripheral system 108 may include, for example, an external hard drive, a mouse, a printer, a keyboard, a display, logic circuitry, analog circuitry and/or a processor.

In an example, the bus 112 is an external connection between the host system 104 and the peripheral system 108, the eUSB2 bus 120 is an interconnect between the eUSB2 repeater 118 and the host device 116, and the eUSB2 bus 126 is an interconnect between the eUSB2 repeater 124 and the peripheral device 122.

In some examples, the peripheral system 108 may include the repeater 124 and the host system 104 may not include the repeater 118. In other examples, the host system 104 may include the repeater 118 and the peripheral system 108 may not include the repeater 124.

In operation, the host device 116 transmits a downstream packet over the eUSB2 bus 120. The repeater 118 converts the downstream packet from eUSB2 signaling voltage levels (e.g., around 1.0 V to 1.2 V) to USB 2.0 signaling voltage levels (e.g., around 3.3 V) and transmits the downstream packet over the bus 112. The repeater 124 receives the downstream packet and converts the downstream packet from USB 2.0 signaling voltage levels (e.g., around 3.3 V) to eUSB2 signaling levels (e.g., around 1.0 V to 1.2 V) and transmits the downstream packet to the peripheral device 122 over the eUSB2 bus 126.

The peripheral device 122 may respond to the host device 116 with an upstream packet which is transmitted to the repeater 124 over the eUSB2 bus 126. The repeater 124 converts the upstream packet from eUSB2 signaling voltage levels to USB 2.0 signaling voltage levels and transmits the upstream packet over the bus 112. The repeater 118 receives the upstream packet and converts the upstream packet from USB 2.0 signaling voltage levels to eUSB2 signaling voltage levels and transmits the upstream packet to the host device 116 over the eUSB2 bus 120.

As described above, in some examples, the eUSB2 bus 126 may be busy (e.g., occupied), such as via the downstream packet. In such examples, the peripheral device 122 is unable to transmit an upstream packet to the repeater 124 over the eUSB2 bus 126. Thus, in examples in which the host system 104 is babbling, the peripheral device 122 is unable to inform the repeater 124 of the babble. To mitigate this, in some examples the repeater 124 includes circuitry (not shown), programming, or a combination thereof to detect the babbling of the host system 104. For example, responsive to the repeater 124 receiver a continuous data flow (e.g., such as a data packet) from the host system 104 without interruption for greater than a programmed amount of time, the repeater 124 determines that the host system 104 is babbling. Responsive to determining that the host system 104 is babbling, the repeater 124 disables repeating of the received communication to the peripheral device 122. In some examples, the repeater 124 disables the repeating of the received communication until the babble condition is resolved (e.g., the host system 104 stops sending data) or the peripheral device 122 resets the repeater 124.

While this description considers examples in which the repeater 124 detects babbling of the host system 104, in various other examples other configurations are possible. For example, the repeater 124 may detect babbling of the peripheral device 122, the repeater 118 may detect babbling of the peripheral device 122, the repeater 118 may detect babbling of the host device 110, or any combination thereof.

Figure 2:
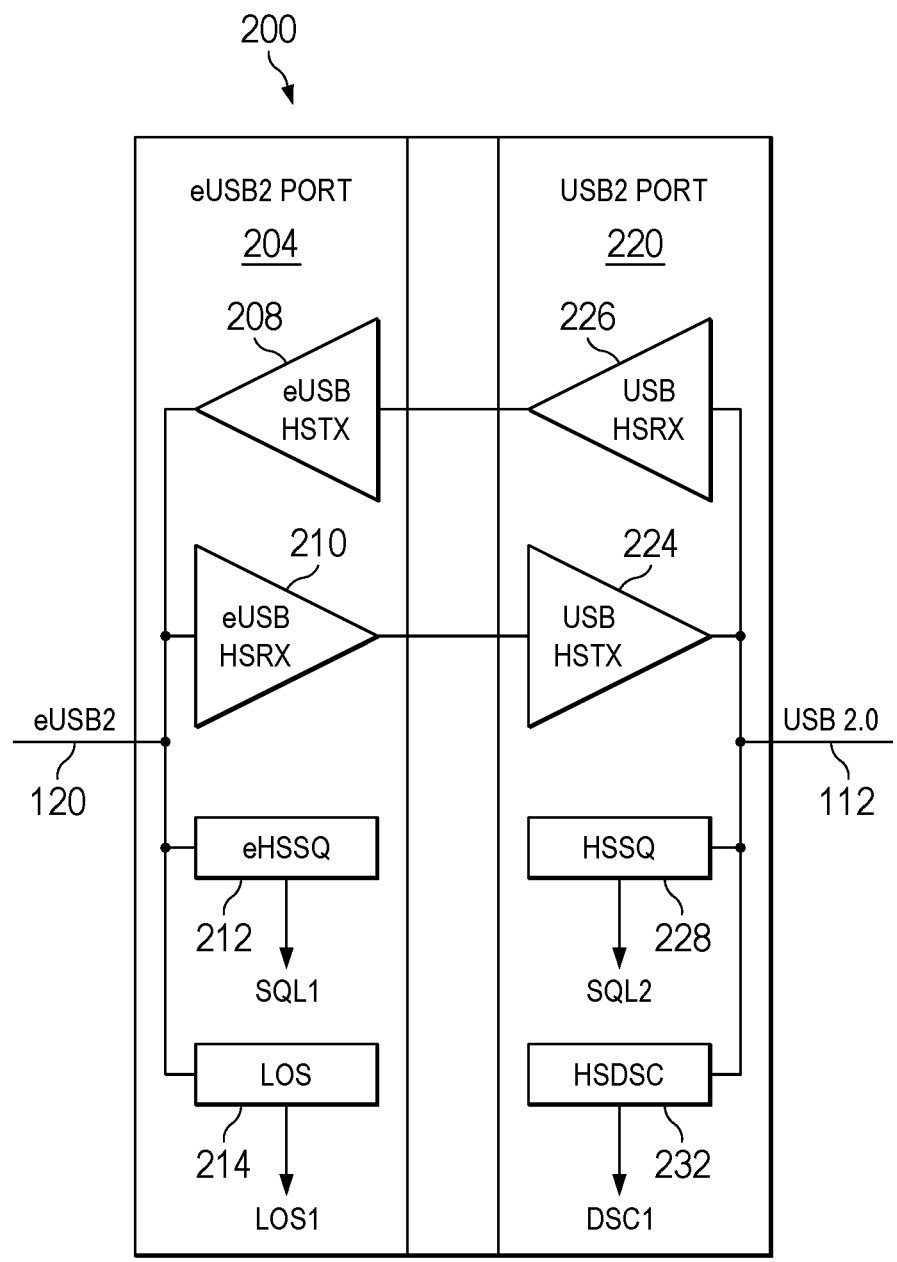
FIG. 2 is a block diagram of example high speed (HS) components of a host-side repeater.

FIG. 2 is a block diagram of high speed (HS) components 200 of the repeater 118, in accordance with various examples. The repeater 118 includes an eUSB2 port 204 configured to interface with the eUSB2 bus 120. The eUSB2 bus 120 provides a connection to the host device 116, as shown in FIG. 1. The eUSB2 port 204 includes an eUSB2 transmitter 208 and an eUSB2 receiver 210. The eUSB2 transmitter 208 transmits an upstream packet to the host device 116 over the eUSB2 bus 120. The eUSB2 receiver 210 receives a downstream packet from the host device 116 over the eUSB2 bus 120. In an example, the eUSB2 transmitter 208 and the eUSB2 receiver 210 are implemented with, or as, buffers.

The eUSB2 port 204 includes a high speed squelch circuit (eHSSQ) 212 which detects downstream packets on the eUSB2 bus 120. The eHSSQ 212 may detect the start of packet (SOP) of a downstream packet transmitted by the host device 116 over the eUSB2 bus 120 and in response assert a squelch signal SQL1 which is indicative of a downstream packet on the eUSB2 bus 120. In an example, to detect the SOP the eHSSQ 212 detects the presence of a differential voltage on data lines of the eUSB2 bus 120 (e.g., D+ and D− data lines), and in response asserts a squelch signal SQL1 to indicate that the host device 116 has placed a downstream packet on the eUSB2 bus 120. The eUSB2 port 204 also includes a loss of signal (LOS) circuit 214 which detects an end of packet (EOP) on the eUSB2 bus 120, and in response asserts a LOS1 signal.

The repeater 118 also includes a USB 2.0 port 220 configured to interface with the bus 112. The bus 112 provides connection with the peripheral system 108, as shown in FIG. 1. The USB 2.0 port 220 includes a USB 2.0 transmitter 224 and a USB 2.0 receiver 226. The USB 2.0 receiver 226 receives an upstream packet from the peripheral system 108 over the bus 112. The USB 2.0 transmitter 224 transmits a downstream packet to the peripheral system 108 over the bus 112. In an example, the USB 2.0 transmitter 224 and the USB 2.0 receiver 226 are implemented with, or as, buffers. In some examples, the eUSB2 port 204 operates at a different voltage (e.g., around 1 V to 1.2 V) than the USB2 port 220 (e.g., around 3 V). In these examples, the repeater 118 may include isolation (e.g., galvanic isolation) between the eUSB2 port 204 and the USB2 port 220 so that these ports can operate at different voltages.

The USB 2.0 port 220 includes a high speed squelch circuit (HSSQ) 228 which detects upstream packets on the bus 112. The HSSQ 228 may detect a SOP of an upstream packet transmitted by the peripheral system 108 over the bus 112 and in response assert a squelch signal SQL2 which is indicative of an upstream packet. In an example, to detect the SOP the HSSQ 228 detects the presence of a differential voltage on the data lines of the bus 112 (e.g., the D+ and D− data lines) and in response asserts the squelch signal SQL2 to indicate that the peripheral system 108 has placed an upstream packet on the bus 112. The USB 2.0 port 220 also includes a high speed disconnect detect circuit (HSDSC) 232 which monitors for removal of peripheral HS termination from the bus 112. The HSDSC 232 asserts a DSC1 signal responsive to disconnection of the peripheral device from the bus 112.

Figure 3:
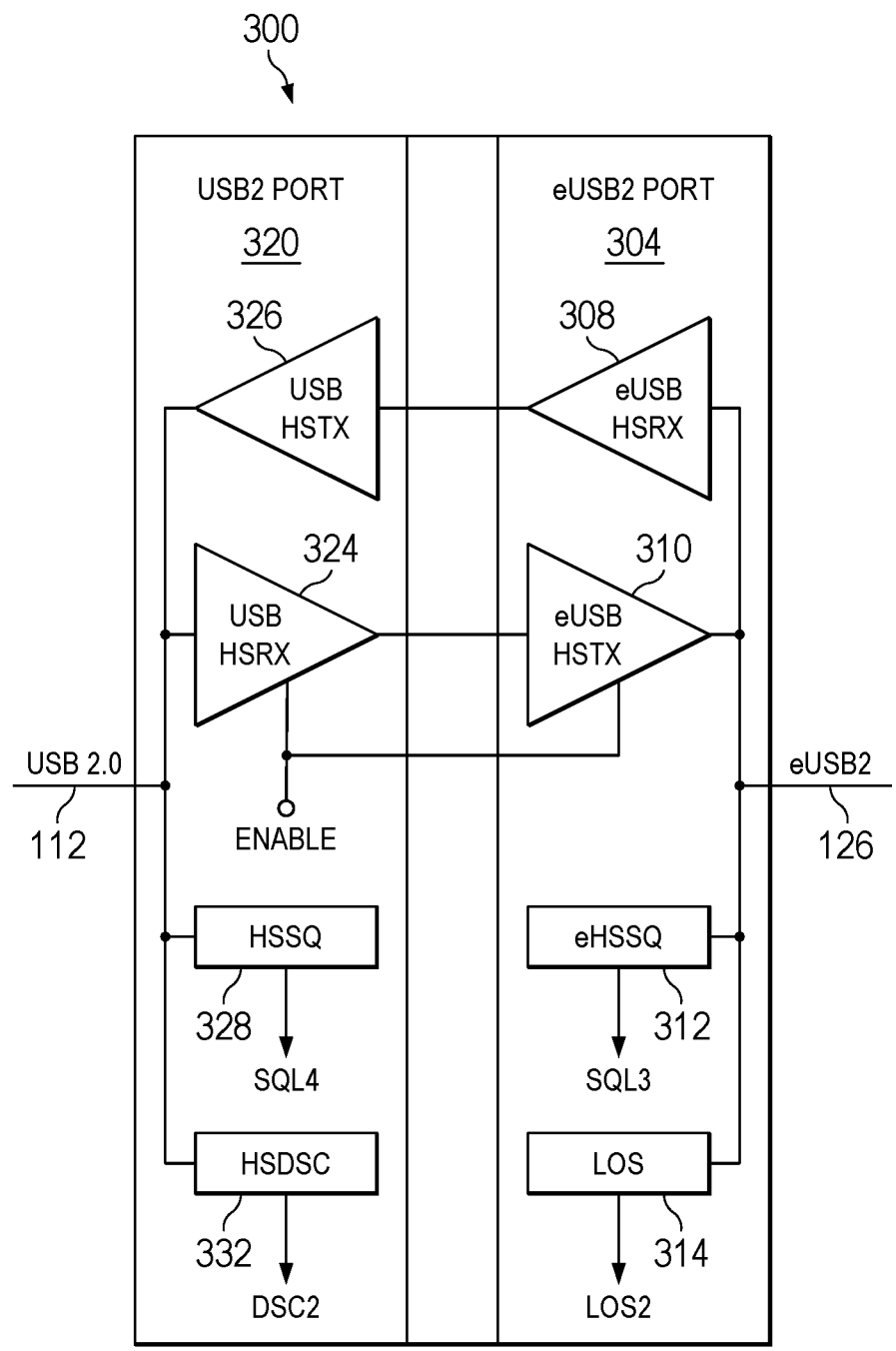
FIG. 3 is a block diagram of example HS components of a peripheral-side repeater.

FIG. 3 is a block diagram of HS components 300 of the repeater 124, in accordance with various examples. The repeater 124 includes an eUSB2 port 304 configured to interface with the eUSB2 bus 126. The eUSB2 bus 126 provides a connection to the peripheral device 122, as shown in FIG. 1. The eUSB2 port 304 includes an eUSB2 receiver 308 and an eUSB2 transmitter 310. The eUSB2 receiver 308 receives an upstream packet from the peripheral device 122 over the eUSB2 bus 126. The eUSB2 transmitter 310 transmits a downstream packet to the peripheral device 122 over the eUSB2 bus 126. In an example, the eUSB2 receiver 308 and the eUSB2 transmitter 310 are implemented with, or as, buffers.

The eUSB2 port 304 includes a high speed squelch circuit (eHSSQ) 312 which detects upstream packets on the eUSB2 bus 126. The eHSSQ 312 may detect the SOP of an upstream packet transmitted by the peripheral device 122 over the eUSB2 bus 126 and, in response, assert a squelch signal SQL3 which is indicative of an upstream packet on the eUSB2 bus 126. In an example, to detect the SOP the eHSSQ 312 detects the presence of a differential voltage on data lines of the eUSB2 bus 126 and, in response, provides a squelch signal SQL3 which indicates that the peripheral device 122 has placed an upstream packet on the eUSB2 bus 126. The eUSB2 port 304 also includes a LOS circuit 314 which detects an end of packet (EOP) on the eUSB2 bus 126 and in response provides a LOS2 signal.

The repeater 124 also includes a USB 2.0 port 320 coupled to a bus 112. The bus 112 provides connection with the host device 116, as shown in FIG. 1. The USB 2.0 port 320 includes a USB 2.0 receiver 324 and a USB 2.0 transmitter 326. The USB 2.0 receiver 324 receives a downstream packet from the host device 116 over the bus 112. The USB 2.0 transmitter 326 transmits an upstream packet to the host device 116 over the bus 112. In an example, the USB 2.0 receiver 324 and the USB 2.0 transmitter 326 are implemented with, or as, buffers. In some examples, the eUSB2 port 304 operates at a different voltage (e.g., about 1 to 1.2 V) than the USB2 port 320 (e.g., about 3 V). In these examples, the repeater 124 may include isolation (e.g., galvanic isolation) between the eUSB2 port 304 and the USB2 port 320 to isolate the ports so that these ports can operate at different voltages.

The USB 2.0 port 320 includes a high-speed squelch circuit HSSQ 328 which detects downstream packets on the bus 112. The HSSQ 328 may detect a SOP of a downstream packet transmitted by the host device 116 and in response assert a squelch signal SQL4 which is indicative of the downstream packet. In an example, to detect the SOP the HSSQ 328 detects the presence of a differential voltage on the data lines of the bus 112 and in response provides SQL4 which indicates that the host system 104 has placed a downstream packet on the bus 112.

In some examples, the USB 2.0 port 320 also includes a high speed disconnect HSDSC 332, while in other examples the HSDSC 332 is omitted, such as in examples, in which peripherals do not detect disconnect through the data lines of the bus 112. The HSDSC 332 asserts a DSC2 signal responsive to disconnection of the host system from the bus 112.

In an example, the USB 2.0 receiver 324 and the eUSB2 transmitter 310 each include an enable input. Responsive to receipt of a signal (Enable) having a value of logic 1 at their enable input, the USB 2.0 receiver 324 and the eUSB2 transmitter 310 are enabled and configured to forward received signals. Responsive to receipt of Enable having a value of logic 0 at their enable input, the USB 2.0 receiver 324 and the eUSB2 transmitter 310 are disabled and configured to not forward received signals. For example, responsive to determination of a babble condition, as described herein, Enable may be provided having a value of logic 0 to disable signal forwarding by the USB 2.0 receiver 324 and the eUSB2 transmitter 310. In some examples, the eUSB2 receiver 210 and the USB 2.0 transmitter 224 may also, or alternatively, have the enable inputs.

Figure 4:
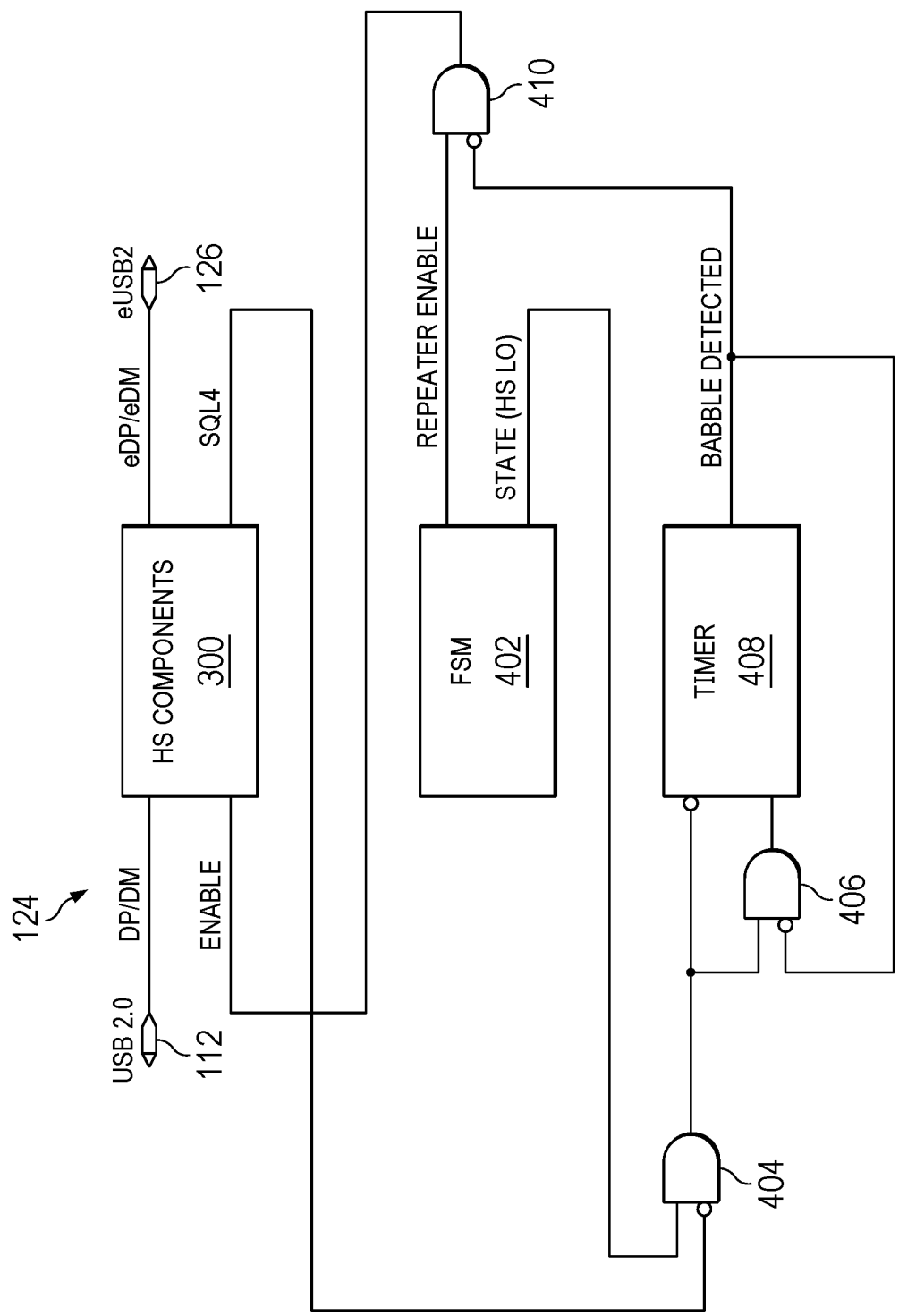
FIG. 4 is a block diagram of an example repeater.

FIG. 4 is a block diagram of an example repeater 124, in accordance with various examples. In some examples, the repeater 124 includes the HS components 300, a state machine 402, a logic circuit 404, a logic circuit 406, a timer 408, and a logic circuit 410. In an example architecture, the HS components 300 are coupled to the bus 112 and the eUSB2 bus 126, as described above with respect to FIG. 3. The HS components 300 also have an enable input (to which Enable is provided) and a status output (at which SQL4 is provided). In some examples, the enable input is of the USB 2.0 receiver 324 and the eUSB2 transmitter 310, as described above with respect to FIG. 3, such that Enable is provided to the USB 2.0 receiver 324 and the eUSB2 transmitter 310. In some examples, the status output of the HS components 300 is the output of the HSSQ 328, as described above with respect to FIG. 3, such that a status signal provided at the status output is SQL4.

The state machine 402 has a first output and a second output. The logic circuit 404 has a first input coupled to the second output of the state machine 402, a second input coupled to the status output of the high speed components 300, and an output. In some examples, the second input of the logic circuit 404 is an inverted input. The second input of the logic circuit 404 may be inverted by coupling an inverter (not shown) between the second input of the logic circuit 404 and the status output of the high speed components 300, or by incorporating inverter circuitry into the circuitry of the logic circuit 404. The logic circuit 406 has a first input coupled to the output of the logic circuit 404, a second input, and an output. The timer 408 has a reset input coupled to the output of the logic circuit 404, an increment input coupled to the output of the logic circuit 406, and an output coupled to the second input of the logic circuit 406. In some examples, the second input of the logic circuit 406 is an inverted input. The second input of the logic circuit 406 may be inverted by coupling an inverter (not shown) between the second input of the logic circuit 406 and the output of the timer 408, or by incorporating inverter circuitry into the circuitry of the logic circuit 406. In some examples, the reset input of the timer 408 is an inverted input. The reset input of the timer 408 may be inverted by coupling an inverter (not shown) between the reset input of the timer 408 and the output of the logic circuit 404, or by incorporating inverter circuitry into the circuitry of the timer 408. The logic circuit 410 has a first input coupled to the first output of the state machine 402, a second input coupled to the output of the timer 408, and an output coupled to the enable input of the high speed components 300. The second input of the logic circuit 410 may be inverted by coupling an inverter (not shown) between the second input of the logic circuit 410 and the output of the timer 408, or by incorporating inverter circuitry into the circuitry of the logic circuit 410.

In an example of operation of the repeater 124 of FIG. 4, the HS components 300 provide an idle signal indicating that the repeater 124 is inactive (not repeating), for example, such that the host system 104 has not placed data on the bus 112 for repeating by the repeater 124. In some examples, the idle signal is an active-high signal (e.g., has a value of logic 1 responsive to the absence of data on bus 112), while in other examples the idle signal is an active-low signal (e.g., has a value of logic 0 responsive to the absence of data on bus 112). In an example, the idle signal is SQL4, as described above.

The state machine 402 provides a state signal at its second output indicating a state of the repeater. Operation of the state machine 402 may proceed according to standard-specified actions. For example, the state machine 402 may provide the state signal (HS L0) having a value determined based on USB or eUSB standards, as described above herein. In an example, the state machine 402 determines the value of the state signal based on values of any one or more of a signal provided on the bus 112, a signal provided on the bus 120, and/or a signal provided on the bus 126, such as represented by SQL4, SQL3, DSC2, and LOS2, as defined in the standard applicable to operation of the state machine 402. Although not shown in FIG. 4, in some examples the state machine 402 receives any one or more of SQL4, SQL3, DSC2, and/or LOS2 as inputs. The state machine 402 may be referred to generically as a processing circuit, or may be implemented by a processing circuit. The processing circuit may be processor, a microprocessor, a controller, an integrated circuit, a field programmable gate array (FPGA), or any other combination of analog, digital, or logic circuits or components coupled to provide functionality including implementation of the state machine 402. In some examples, the logic circuit 404 perform an AND logical operation such that, responsive to the state signal having a value of logic 1 (e.g., representing the repeater 124 being in a normal functional mode in which high speed data transmission is available) and the idle signal having a value of logic the logic circuit 404 provides a reset signal at its output having a value of logic 1. Responsive to the idle signal having a value of logic 1, or the state signal having a value of logic 0 (e.g., representing the repeater 124 being in a low power mode in which high speed data transmission is not available), the logic circuit 404 provides the reset signal having a value of logic 0.

In some examples, the logic circuit 406 performs an AND logical operation such that, responsive to the reset signal having a value of logic 1 and a timer signal provided at the output of the timer 408 having a value of logic 0, the logic circuit 406 provides an increment signal having a value of logic 1. Responsive to the timer signal having a value of logic 1, or the reset signal having a value of logic 0, the logic circuit 406 provides the increment signal having a value of logic 0. The timer 408 includes any suitable circuitry for maintaining and incrementing a count, and providing the timer signal responsive to the count exceeding a programmed value. In some examples, the timer signal has a value of logic 0 responsive to a count maintained by the timer 408 being less than the programmed value and a value of logic 1 responsive to the count maintained by the timer 408 being greater than the programmed value. In some examples, the programmed value is representative of the longest packet duration specified in the communication standard according to which the repeater 124 is operating, as described above herein. In some examples, the timer 408 is clocked by a clock signal (not shown) such that responsive to the reset signal having a value of logic 1 and the increment signal having a value of logic 0, a count maintained by the timer 408 is incremented at an edge of the clock signal. In an example, clock signal is provided by an internal free-running oscillator (not shown) of the timer 408 that clocks the timer 408. In some examples, the edge is a rising edge of the clock signal, while in other examples the edge is a falling edge of the clock signal.

The state machine 402 also provides a repeater enable signal at its first output. The state machine 402 determines a value of the repeater enable signal. In some examples, the logic circuit 410 performs an AND logical operation such that, responsive to the repeater enable signal having a value of logic 1 and the timer signal having a value of logic 0, the logic circuit 410 provides Enable having a value of logic 1. Responsive to the repeater enable signal having a value of logic 0, or the timer signal having a value of logic 1, the logic circuit 410 provides Enable having a value of logic 0. Responsive to Enable having a value of logic 1, the HS components 300 repeat data received on the bus 112 to the eUSB2 bus 126. Responsive to Enable having a value of logic 0, representing a babble condition of a device that provided data on the bus 112, the HS components 300 are disabled and do not repeat data received on the bus 112 to the eUSB2 bus 126. For example, Enable having the value of logic 0 causes the USB 2.0 receiver 324 and the eUSB2 transmitter 310 to be disabled and configured to not forward received signals, as described above with respect to FIG. 3.

Figure 5:
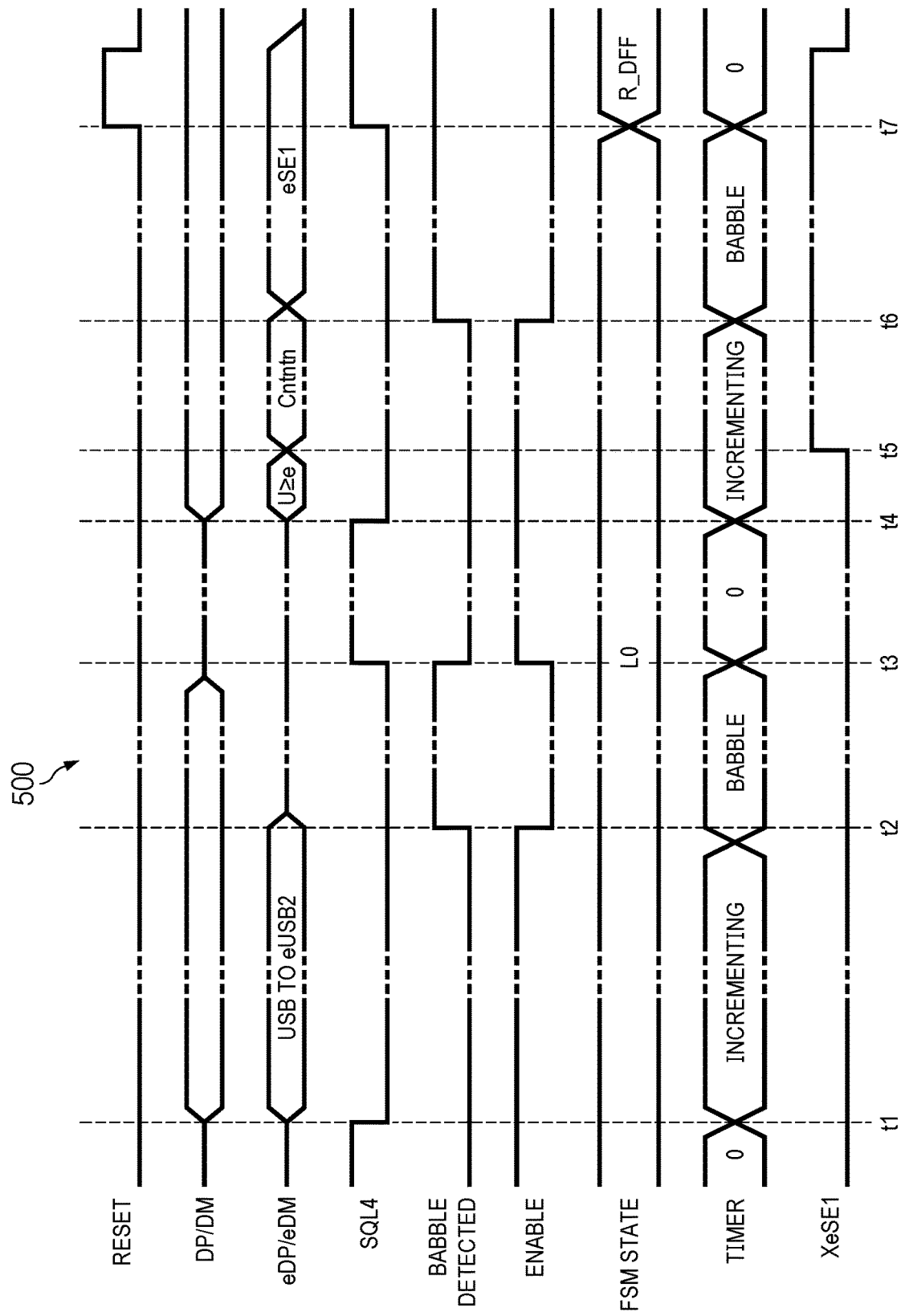
FIG. 5 is a timing diagram of example signals.

FIG. 5 is a timing diagram 500 of signals, in accordance with various examples. In an example, the signals may be present in and/or representative of operation of a system such as the system 100, the peripheral system 108, and/or the repeater 124. The diagram 500 includes DP and DM, representative of a positive component and a negative component of a differential signal provided on the bus 112 (e.g., an input to the repeater 124), eDP and eDM, representative of a positive component and a negative component of a differential signal provided on the bus 126 (e.g., an output of the repeater 124), SQL4, an output signal of the timer 408 indicating that a babble condition is detected, Enable, a state of the state machine 402, a status of the timer 408, and a bus reset signal (XeSE1).

In some examples, at time t1, data (e.g., DP/DM) is detected on the bus 112. Responsive to detection of the data, SQL4 is set to a value of logic 0, and the data is forwarded to the bus 126 as eDP/eDM. Responsive to SQL4 being set to the value of logic 0, the timer 408 begins to increment. At time t2, a count maintained by the timer 408 reaches a programmed value indicating a maximum duration for DP/DM according to a communication standard based on which DP/DM are provided. Responsive to the count reaching that maximum duration, the timer 408 provides an output signal having a value of logic 1 to indicate that a babble condition on the bus 112 has been detected. Responsive to the output signal of the timer 408 having the value of logic 1, Enable is provided having a value of logic 0. Enable having the value of logic 0 causes repeating of DP/DM as eDP/eDM to be disabled, as described above herein. At time t3, data is no longer provided on the bus 112 and SQL4 is provided having a value of logic 1. Responsive to SQL4 having the value of logic 1, the timer 408 resets to a count of 0, the output signal of the timer 408 is set to logic 0, and Enable is provided having a value of logic 1. Enable having the value of logic 1 causes repeating of DP/DM as eDP/eDM to be enabled, as described above herein.

At time t4, DP/DM is detected on the bus 112. Responsive to detection of DP/DM, SQL4 is set to a value of logic 0 and DP/DM is forwarded to the bus 126 as eDP/eDM. Responsive to SQL4 being set to the value of logic 0, the timer 408 begins to increment. At time t5, the peripheral device 122 provides XeSE1 having a value of logic 1. In some examples, XeSE1 is a bus or port reset signal. The repeater 124 may be configured to reset, enter an unconnected state, or perform other actions responsive to receipt of XeSE1 having a value of logic 1. However, eDP/eDM being repeated on the bus 126 by the repeater 124 may cause contention on the bus 126, blocking the repeater 124 from receiving XeSE1 from the peripheral device 122. At time t6, a count maintained by the timer 408 reaches a programmed value indicating a maximum duration for DP/DM according to a communication standard based on which DP/DM are provided. Responsive to the count reaching that maximum duration, the timer 408 provides an output signal having a value of logic 1 to indicate that a babble condition on the bus 112 has been detected. Responsive to the output signal of the timer 408 having the value of logic 1, Enable is provided having a value of logic 0. Enable having the value of logic 0 causes repeating of DP/DM as eDP/eDM on the bus 126 to be disabled, as described above herein.

Disabling repeating on the bus 126 may resolve the contention with the peripheral device 122 transmitting XeSE1 having a value of logic 1. As a result, at time t7, the repeater 124 detects the logic 1 value of XeSE1 and asserts a reset signal to reset, enter an unconnected state, or perform other actions.

Figure 6:
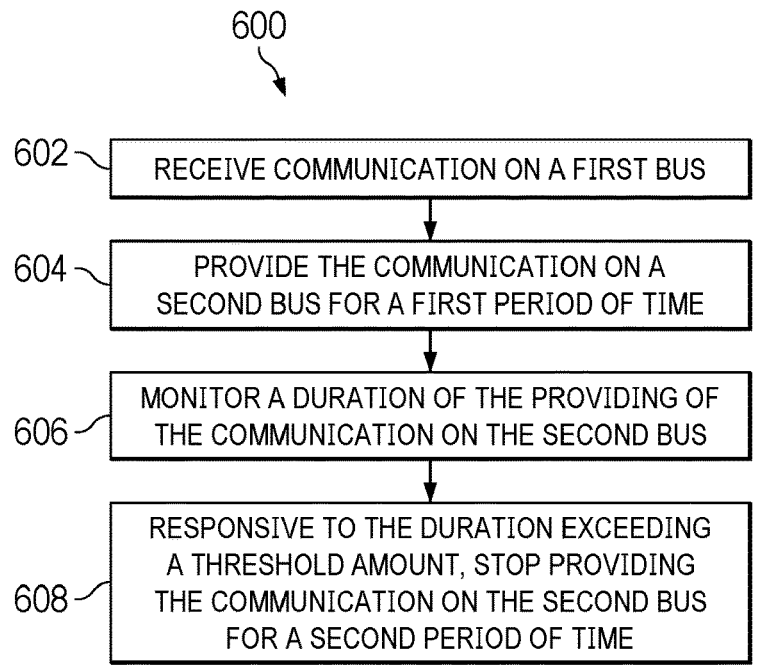
FIG. 6 is a flow diagram of an example method.

FIG. 6 is a flow diagram of a method 600, in accordance with various examples. In some examples, the method 600 is implemented by a repeater, such as the repeater 124, as described above herein. The method 600 is implemented to, for example, detect a babble condition of a device providing data to the repeater and cease repeating of the data responsive to detection of the babble condition.

At operation 602, the repeater receives communication on a first bus. In some examples, the first bus is a USB 2.0 bus, such as the USB 2.0 bus 112, and the communication is received from a USB 2.0 device. In other examples, the first bus is an eUSB2 bus, such as the eUSB2 bus 126 and the communication is received from an eUSB2 device. In some examples, the communication is arranged into packets that are subject to maximum packet length or maximum duration limitations to comply with a particular communication protocol or standard.

At operation 604, the repeater provides the communication on a second bus for a first period of time. The providing of the communication on the second bus may be referred to as repeating the communication received at operation 602 on the first bus. In some examples, the second bus is an eUSB2 bus and the communication is provided to an eUSB2 device. In other examples, the second bus is a USB 2.0 bus and the communication is provided to a USB 2.0 device.

At operation 606, the repeater monitors a duration of the providing of the communication on the second bus. In another examples, the repeater monitors a duration of the receipt of the communication on the first bus. In some examples, the repeater monitors the duration by incrementing a count of a timer for a monitored time period.

At operation 608, responsive to the duration exceeding a threshold amount, the repeater stops providing the communication on the second bus for a second period of time. For example, responsive to the duration exceeding a threshold or programmed amount, the repeater determines that a babble condition exists. The threshold or programmed amount is, for example, a maximum packet length or duration for the communication. The maximum packet length or duration may be a duration of time specified in a communication protocol, standard, or specification, such as described above herein. In some examples, the repeater stops repeating or providing the communication on the second bus by de-asserting a repeater enable signal.

Figure 7:
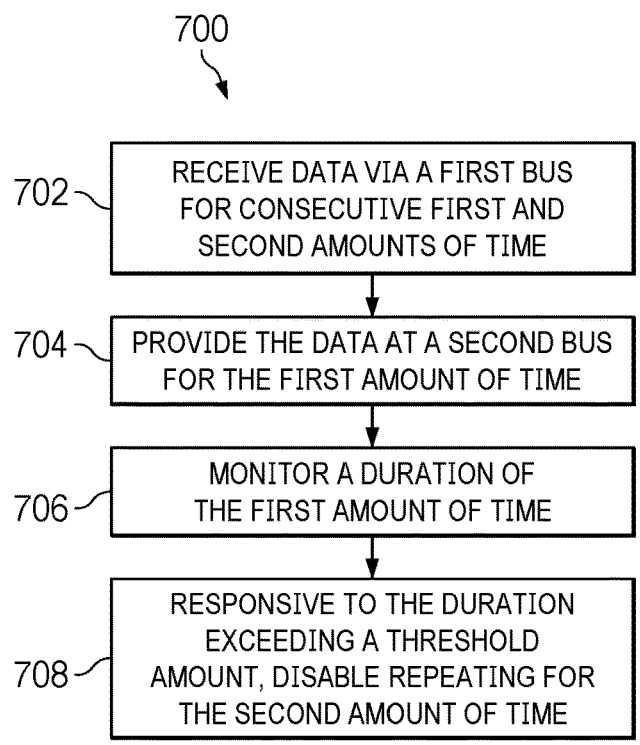
FIG. 7 is a flow diagram of an example method.

FIG. 7 is a flow diagram of a method 700, in accordance with various examples. In some examples, the method 700 is implemented by a repeater, such as the repeater 124, as described above herein. The method 700 is implemented to, for example, detect a babble condition of a device providing data to the repeater and cease repeating of the data responsive to detection of the babble condition.

At operation 702, the repeater receives data via a first bus for consecutive first and second amounts of time. In some examples, the first bus is a USB 2.0 bus, and the data is received from a USB 2.0 device. In other examples, the first bus is an eUSB2 bus, and the data is received from an eUSB2 device. In some examples, the data is arranged into packets that are subject to maximum packet length or maximum duration limitations to comply with a particular communication protocol or standard.

At operation 704, the repeater provides the data at a second bus for the first amount of time. The providing of the data on the second bus may be referred to as repeating the data received at operation 702 on the first bus. In some examples, the second bus is an eUSB2 bus, and the data is provided to an eUSB2 device. In other examples, the second bus is a USB 2.0 bus, and the data is provided to a USB 2.0 device.

At operation 706, the repeater monitors a duration of the first amount of time. In some examples, the repeater monitors the duration by incrementing a count of a timer for a monitored time period.

At operation 708, responsive to the duration exceeding a threshold amount, the repeater disables repeating for the second amount of time. For example, responsive to the duration (e.g., the first amount of time) meeting or exceeding the threshold or programmed amount, the repeater determines that a babble condition of the data, or a device providing the data, exists. The threshold or programmed amount is, for example, a maximum packet length or duration for the data. The maximum packet length or duration may be a duration of time specified in a communication protocol, standard, or specification, such as described above herein. In some examples, the repeater stops repeating or providing the data on the second bus by de-asserting a repeater enable signal.

Figure 8:
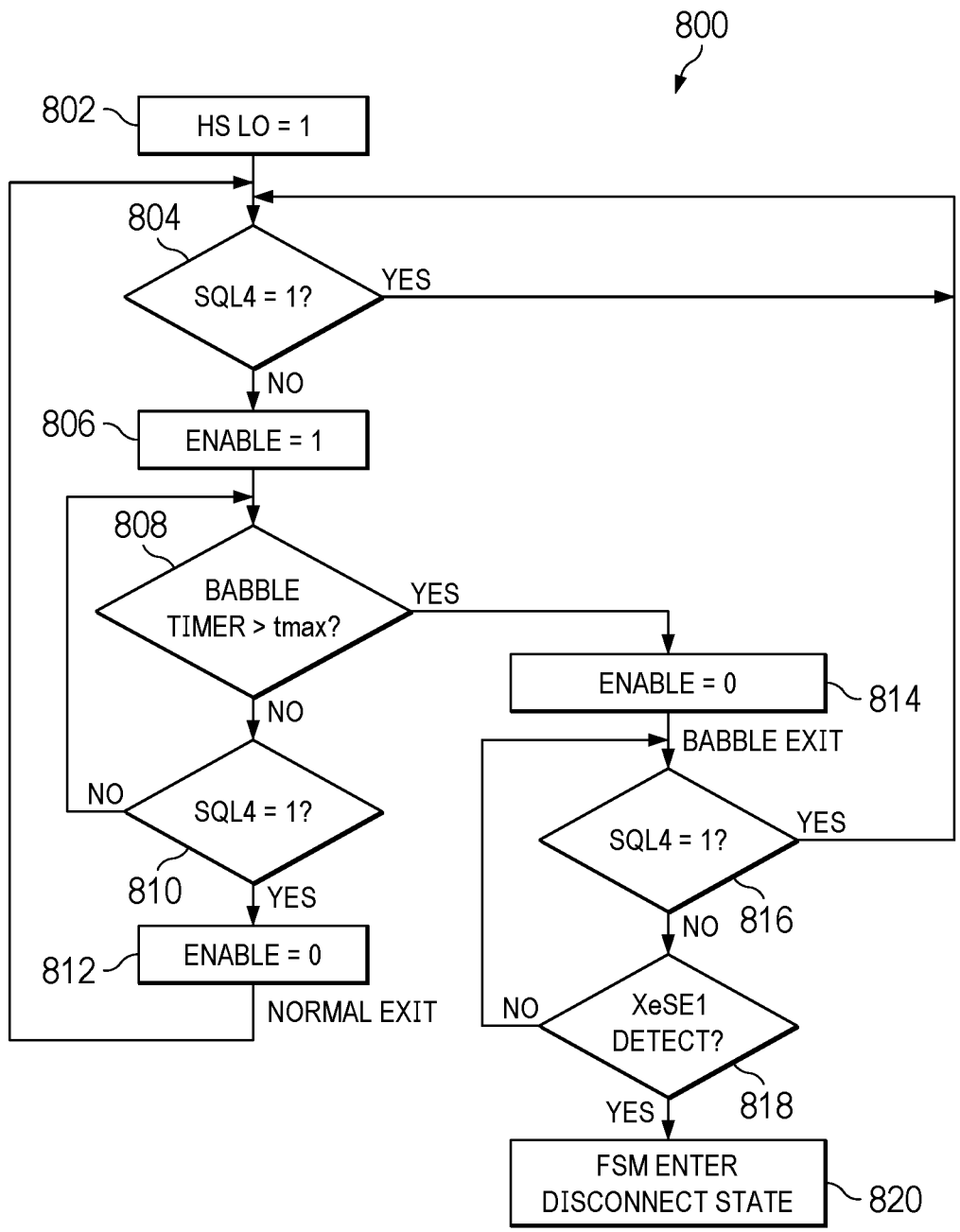
FIG. 8 is a flow diagram of an example method.

FIG. 8 is a flow diagram of a method 800, in accordance with various examples. In some examples, the method 800 is implemented by a repeater, such as the repeater 124, as described above herein. The method 800 is implemented to, for example, control operation of the repeater 124.

At operation 802, the repeater 124 enters high speed operation (e.g., HS LO=1). The repeater 124 entering high speed operation may be determined by the state machine 402, such as based on values of any one or more of SQL2, SQL4, a signal provided on the bus 112, a signal provided on the bus 120, and/or a signal provided on the bus 126, as defined in the standard applicable to operation of the state machine 402.

At operation 804, the repeater 124 determines whether SQL4 has a value of logic 1. Responsive to SQL4 having a value of logic 1, the method 800 remains at operation 802. Responsive to SQL4 not having a value of logic 1, the method 800 proceeds to operation 806. Although not explicitly shown in FIG. 8, the operation 804 may be responsive to the receipt of data for repeating by the repeater 124, such as DP/DM on the bus 112 for repeating as eDP/eDM on the bus 126, as described above herein.

At operation 806, the repeater 124 sets Enable to a value of logic 1 and repeats DP/DM as eDP/eDM, proceeding to operation 808.

At operation 808, the timer 408 determines whether an incrementing count (e.g., babble timer) has exceeded a programmed value (e.g., tmax). In an example, tmax is determined as described above herein based on a communication standard or protocol according to which DP/DM is provided. Responsive to the babble timer not having exceeded tmax, the method proceeds to operation 810.

At operation 810, the repeater 124 determines whether SQL4 has a value of logic 1. Responsive to SQL4 not having a value of logic 1, the method 800 returns to operation 808. Responsive to SQL4 having a value of logic 1, the method 800 proceeds to operation 812.

At operation 812, the repeater 124 sets Enable to a value of logic 0, disabling the repeating of DP/DM as eDP/eDM on the bus 126. Subsequently, the method 800 returns to operation 804.

Returning to operation 808, responsive to the babble timer exceeded tmax, the method proceeds to operation 814. At operation 814, the repeater 124 sets Enable to a value of logic 0, disabling the repeating of DP/DM as eDP/eDM on the bus 126. Subsequently, the method 800 proceeds to operation 816.

At operation 816, the repeater 124 determines whether SQL4 has a value of logic 1. Responsive to SQL4 having a value of logic 1, the method 800 returns to operation 804. Responsive to SQL4 not having a value of logic 1, the method 800 proceeds to operation 818.

At operation 818, the repeater 124 determines whether XeSE1 is being received having a value of logic 1. Responsive to XeSE1 not being received having a value of logic 1, the method 800 returns to operation 816. Responsive to XeSE1 being received having a value of logic 1, the method 800 proceeds to operation 820.

At operation 820, the repeater 124 resets or enters an unconnected/disconnected state responsive to the logic 1 value of XeSE1. In some examples, the state signal is set to a value of logic 0 responsive to the repeater 124 entering the unconnected/disconnected state.

While the operations of the methods 600, 700, 800 have been discussed and labeled with numerical reference, in various examples the methods 600, 700, 800 include additional operations that are not recited herein (e.g., such as intermediary comparisons, logical operations, output selections such as via a multiplexer, etc.). In some examples any one or more of the operations recited herein include one or more sub-operations (e.g., such as intermediary comparisons, logical operations, output selections such as via a multiplexer, etc.), in some examples any one or more of the operations recited herein is omitted, and/or in some examples any one or more of the operations recited herein is performed in an order other than that presented herein (e.g., in a reverse order, substantially simultaneously, overlapping, etc.), all of which is intended to fall within the scope of this description.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter. Modifications are possible in the described examples, and other examples are possible within the scope of the claims.

What is claimed is:

1. An apparatus, comprising:
   a circuit that includes:
      repeater circuitry having first and second inputs and first and second outputs;
      a processing circuit having first and second outputs;
      a first logic circuit having an output and first and second inputs, wherein the first input of the first logic circuit is coupled to the second output of the processing circuit, and the second input of the first logic circuit is coupled to the second output of the repeater circuitry;
      a second logic circuit having an output and first and second inputs, wherein the first input of the second logic circuit is coupled to the output of the first logic circuit;
      a timer circuit having an output and first and second inputs, wherein the first input of the timer circuit is coupled to the output of the first logic circuit, the second input of the timer circuit is coupled to the output of the second logic circuit, and the output of the timer circuit is coupled to the second input of the second logic circuit; and
      a third logic circuit having an output and first and second inputs, wherein the first input of the third logic circuit is coupled to the first output of the processing circuit, the second input of the third logic circuit is coupled to the output of the timer circuit, and the output of the third logic circuit is coupled to the second input of the repeater circuitry;
      wherein the repeater circuitry includes a squelch detector that detects downstream packets.

2. The apparatus of claim 1, wherein the processing circuit implements a finite state machine.

3. The apparatus of claim 1, wherein the first, second, and third logic circuits are AND logic circuits, in which the second input of the of the first logic circuit, the second input of the second logic circuit, and the second input of the third logic circuit are inverted inputs, and the first input of the timer circuit is an inverted input.

4. The apparatus of claim 1, wherein the circuit is an embedded Universal Serial Bus (eUSB) repeater.

5. The apparatus of claim 4, further comprising a Universal Serial Bus device coupled to the first input of the repeater circuitry and an eUSB device coupled to the first output of the repeater circuitry.

6. An apparatus, comprising:
   a circuit configured to:
      receive communication on a first bus;
      provide the communication on a second bus for a first period of time;
      monitor a duration of the providing of the communication on the second bus; and
      responsive to the duration exceeding a threshold amount, stop providing the communication on the second bus for a second period of time;
   wherein the circuit includes a squelch detector that detects downstream packets;
   wherein the circuit further includes:
      repeater circuitry having first and second inputs and first and second outputs;
      a processing circuit having first and second outputs;
      a first logic circuit having an output and first and second inputs, wherein the first input of the first logic circuit is coupled to the second output of the processing circuit, and the second input of the first logic circuit is coupled to the second output of the repeater circuitry;
      a second logic circuit having an output and first and second inputs, wherein the first input of the second logic circuit is coupled to the output of the first logic circuit;
      a timer circuit having an output and first and second inputs, wherein the first input of the timer circuit is coupled to the output of the first logic circuit, the second input of the timer circuit is coupled to the output of the second logic circuit, and the output of the timer circuit is coupled to the second input of the second logic circuit; and
      a third logic circuit having an output and first and second inputs, wherein the first input of the third logic circuit is coupled to the first output of the processing circuit, the second input of the third logic circuit is coupled to the output of the timer circuit, and the output of the third logic circuit is coupled to the second input of the repeater circuitry.

7. The apparatus of claim 6, wherein the first bus is a Universal Serial Bus bus and the second bus is an eUSB bus.

8. The apparatus of claim 6, wherein the circuit is configured to determine a babble condition exists responsive to the duration exceeding the threshold amount.

9. The apparatus of claim 6, wherein the threshold amount is a maximum packet length for the communication.

10. The apparatus of claim 9, wherein the maximum packet length is a duration of time specified in a Universal Serial Bus Specification.

11. The apparatus of claim 6, wherein to stop providing the communication on the second bus, the third logic circuit is configured to provide a repeater enable signal having a deasserted value at the second input of the repeater circuitry.

12. The apparatus of claim 6, wherein the timer circuit is configured to monitor the duration of the communication on the first bus.

* * * * *